United States Patent [19]

Brodeur et al.

[11] 3,844,226

[45] Oct. 29, 1974

[54] RAILWAY CAR TRUCK

[76] Inventors: Rene H. Brodeur, 2108 Beechwood Ave., Wilmette, Ill. 60091; Boris Terlecky, 234 Lippincott Ln., Fox Lake, Ill. 60020; Lawrence P. Greenfield, 927 Hinman Ave., Evanston, Ill. 60202

[22] Filed: June 11, 1973

[21] Appl. No.: 368,486

[52] U.S. Cl. .............................. 105/222, 105/224.1
[51] Int. Cl. ............................................. B61f 5/26
[58] Field of Search..... 105/218 R, 222, 223, 224.1, 105/225; 308/6 R

[56] References Cited
UNITED STATES PATENTS

| | | | |
|---|---|---|---|
| 2,844,430 | 7/1958 | Bogar, Jr. ........................... | 308/3.6 |
| 3,301,611 | 1/1967 | Dunlap............................ | 308/6 R X |
| 3,302,589 | 2/1967 | Williams ............................. | 105/222 |
| 3,397,653 | 8/1968 | Williams ......................... | 105/222 X |
| 3,670,660 | 6/1972 | Weber et al. .................... | 105/222 X |

*Primary Examiner*—M. Henson Wood, Jr.
*Assistant Examiner*—John J. Love

[57] ABSTRACT

A railway car truck in which the journals and associated adapters of the wheel and axle assemblies are received in pedestal openings in side frames and including bearing structure disposed between the adapters and roofs of the associated openings. The portion of the bearing structure carried on each adapter has a low coefficient of friction and is in slidable engagement with an associated portion on the roof of the pedestal opening. This arrangement permits a lateral slidable movement between the adapter and the side frame.

3 Claims, 2 Drawing Figures

PATENTED OCT 29 1974　　　　　　　　　　　　　3,844,226

RAILWAY CAR TRUCK

BACKGROUND OF THE INVENTION

The invention relates to standard railway freight car trucks and particularly to novel bearing structure disposed between the wheel and axle assemblies and the side frames of the truck.

Even more particularly the arrangement of the bearing structure is such that the lateral movement of the wheel and axle assemblies, relative to the side frames, can be satisfactorily accommodated. As is known the lateral movement of the wheel and axle assembly in a freight truck during the course of its movement along a track is primarily due to the conical wheel treads. As a result the assembly traverses a sinusoidal curve commonly known as a "nosing." As this motion is transmitted to the side frames of the truck the effect is to cause the car body to shift laterally from side to side in a swaying motion.

The above described effect is, of course, undesirable because it can cause lading damage and even derailment of the railway car.

Attempts have been made previously to, in effect, dampen or reduce the lateral forces transmitted to the side frames of the truck as the result of the associated wheel and axle assemblies "nosing" movement. Such attempts however have not proven to be entirely satisfactory.

SUMMARY OF THE INVENTION

It is therfore an object of the invention to provide an arrangement for interconnecting the journal saddles of the wheel and axle assemblies in a railway freight car and the associated side frames of the truck in order to avoid the problems now being encountered.

In general the invention involves introducing a nonmetallic material of a very low coefficient of friction between the journal housing adapter and the load bearing area of the truck side frame. With this arrangement the wheel sets are permitted to traverse laterally in each direction with respect to the truck side frame. Thus the inherent side to side motions of a wheelset, generated by the coned tread surface on the wheels, is not transmitted to the truck side frame mass due to the decoupling action provided by the very low coefficient of friction between the journal bearing at the side frame.

This decoupling in turn prevents the wheelsets from exciting into motion the large masses of truck parts such as side frames and bolsters and thus preventing detrimental resonant build-up of motions of these parts especially when the decoupling feature at the journal bearings is used in conjunction with side bearers providing controlled frictional longitudinal damping.

DESCRIPTION OF THE PREFERRED EMBODIMENT

Figure 1:
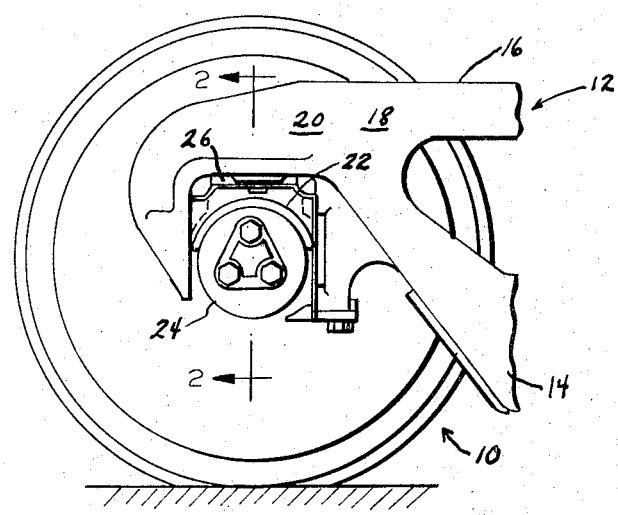
FIG. 1 is a side elevation showing a portion of the side frame of a railway car truck and an associated wheel and axle assembly.

Referring to FIG. 1 of the drawing, only a portion of a railway car truck is shown. As the invention is not concerned with other details of the truck, the figure shows only that portion of the truck in the area of interconnection of a journaled wheel and axle assembly, generally indicated at 10, with a side frame, generally indicated at 12. The side frame, in a known manner, has a tension member 14 and a compression member 16. These members merge, as at 18, and provide a pedestal jaw 20 for receiving an adapter 22 and associated bearing assembly 24 of the journaled wheel and axle assembly 10.

Figure 2:
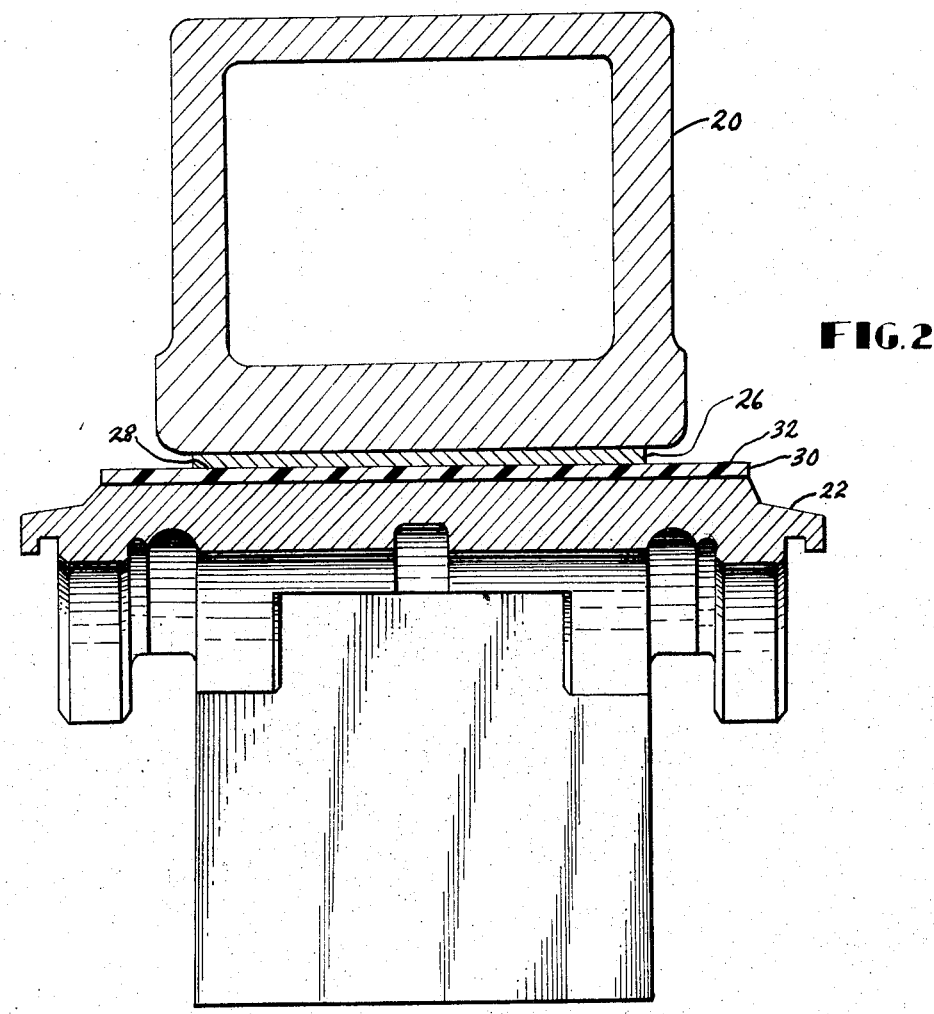
FIG. 2 is a vertical sectional view, taken along line 2—2 of FIG. 1, but with the bearing assembly removed.

Turning now to FIG. 2, it can be seen that a stainless steel contact plate 26 is secured, as by welding, to the pedestal jaw 20 at the roof of the side frame pedestal opening. The surface 28 of the contact plate has a smooth finish which can be in the order of 16 micro inches.

On the top surface of adapter 22 there is mounted a plate 30 of nonmetallic material. In its operative position the surface 28 of contact plate 26 is in load bearing relationship with the surface 32 of plate 30.

The plate 30 should have a very low coefficient of friction in the order of about 0.015 to about 0.10. With this arrangement, when there is side to side motion of a wheel and axle assembly due to the coned shape of the wheels plate 30 slides along the surface 28 of contact plate 26 in a back and forth easy movement. This lateral play is limited by cooperating contact surfaces on the adapter and the walls defining the sides of the side frame pedestal opening. This is not shown as it is well known in the art but the lateral play permitted on each side of the truck side frame is in the order of ¾ inch in each direction. For this reason, as seen in FIG. 2, plate 30 is longer, in the direction of transverse movement of the wheel and axle assembly, than plate 26. The widths of the respective plates 26 and 30 are such as to provide the desired load bearing area.

An example of a suitable plate 30, according to the invention, is a bearing produced by Merriman Inc. of Hingham, Mass. under their Trademark "Lubrite F." This bearing is composed of a woven teflon (TFE) layer mechanically bonded to a base plate.

What is claimed is:

1. In a railway car truck having side frames with pedestal openings for respectively receiving the journals and adapters of associated wheel and axle assemblies, each of the openings having a roof surface, the improvement which comprises bearing means having a low coefficient of friction disposed between the adapter and the roof surface at each pedestal opening, and said bearing means providing the sole load bearing surfaces between the truck side frames and the wheel and axle assemblies, whereby the journals and adapters of wheel and axle assemblies are slidable engaged with the roof surfaces at each pedestal opening, wherein said bearing means consists of a stainless steel plate secured to each respective roof surface and having a surface in facing relationship to the adapter, and a nonmetallic plate having a low coefficient of friction secured to the adapter and receiving said stainless steel plate in load bearing engagement only along said surface thereof.

2. An arrangement as defined in claim 1, wherein said nonmetallic plate has a coefficient of friction of in the range of about 0.015 to about 0.10.

3. An arrangement as defined in claim 1, wherein the surface of said stainless steel plate received in load bearing engagement with said nonmetallic plate has a finish of about 16 micro inches.

\* \* \* \* \*

UNITED STATES PATENT OFFICE
CERTIFICATE OF CORRECTION

Patent No. 3,844,226              Dated    October 29, 1974

Inventor(s) Rene H. Brodeur et al

It is certified that error appears in the above-identified patent and that said Letters Patent are hereby corrected as shown below:

After [76] and before [22] on cover page should appear

--[73] Assignee: Trailer Train Company, Chicago, Illinois--

Signed and sealed this 24th day of June 1975.

(SEAL)
Attest:

RUTH C. MASON
Attesting Officer

C. MARSHALL DANN
Commissioner of Patents
and Trademarks